(12) United States Patent
Meijer et al.

(10) Patent No.: US 11,099,320 B2
(45) Date of Patent: Aug. 24, 2021

(54) METHOD FOR COATING AN OPTICAL FIBRE AND AN OPTICAL FIBRE COMPRISING THE SAME

(71) Applicant: Fractal Coatings B.V., Deurne (NL)

(72) Inventors: Jack Meijer, Eindhoven (NL); Ricky Nijenhuis, Harderwijk (NL); George Lodewijk van den Berg, 's-Gravenhage (NL)

(73) Assignee: Fractal Coatings B.V., Deurne (NL)

( * ) Notice: Subject to any disclaimer, the term of this patent is extended or adjusted under 35 U.S.C. 154(b) by 0 days.

(21) Appl. No.: 16/975,768

(22) PCT Filed: Apr. 11, 2019

(86) PCT No.: PCT/NL2019/050218
§ 371 (c)(1),
(2) Date: Aug. 26, 2020

(87) PCT Pub. No.: WO2019/203639
PCT Pub. Date: Oct. 24, 2019

(65) Prior Publication Data
US 2020/0400881 A1 Dec. 24, 2020

(30) Foreign Application Priority Data
Apr. 16, 2018 (NL) ................................ 2020771

(51) Int. Cl.
| | | |
|---|---|---|
| *G02B 6/02* | (2006.01) | |
| *C03C 25/106* | (2018.01) | |
| *C03C 25/1065* | (2018.01) | |
| *C03C 25/285* | (2018.01) | |
| *C03C 25/6226* | (2018.01) | |
| *C09D 133/02* | (2006.01) | |
| *G02B 6/44* | (2006.01) | |

(52) U.S. Cl.
CPC ........ *G02B 6/02395* (2013.01); *C03C 25/106* (2013.01); *C03C 25/1065* (2013.01); *C03C 25/285* (2013.01); *C03C 25/6226* (2013.01); *C09D 133/02* (2013.01); *G02B 6/4494* (2013.01); *C03C 2217/70* (2013.01)

(58) Field of Classification Search
CPC .............. G02B 6/02395; G02B 6/4494; C03C 25/106; C03C 25/1065; C03C 25/285; C03C 25/6226; C03C 2217/70; C09D 133/02
See application file for complete search history.

(56) References Cited

U.S. PATENT DOCUMENTS

| | | | | |
|---|---|---|---|---|
| 5,059,664 A * | 10/1991 | Yada | .......................... | B01J 19/26 526/240 |
| 5,242,477 A * | 9/1993 | Edmonston | ........... | C23C 16/545 118/718 |
| 5,756,159 A | 5/1998 | Hoskins et al. | | |
| 5,906,788 A * | 5/1999 | Boeckler | .............. | B29C 37/0032 264/255 |
| 6,489,376 B1 * | 12/2002 | Khudyakov | ........ | C08F 283/006 522/120 |
| 6,797,740 B2 * | 9/2004 | Abel | .................... | C03C 25/1065 385/114 |
| 7,026,373 B2 * | 4/2006 | Smith | .................... | C08F 220/04 427/487 |
| 10,155,873 B2 * | 12/2018 | Takiguchi | ............. | C09D 11/322 |
| 2003/0169989 A1 * | 9/2003 | Abel | ......................... | C09D 4/06 385/128 |
| 2003/0207958 A1 * | 11/2003 | Smith | .................... | C08F 220/04 522/173 |
| 2005/0028731 A1 * | 2/2005 | Lindholm | ............... | C03C 25/18 118/400 |
| 2015/0065594 A1 * | 3/2015 | Wendker | ............... | C08F 220/06 521/113 |
| 2015/0314034 A1 * | 11/2015 | Horner | ...................... | C08J 9/12 252/194 |
| 2017/0137653 A1 * | 5/2017 | Takiguchi | ............. | C09D 11/101 |

FOREIGN PATENT DOCUMENTS

| | | |
|---|---|---|
| EP | 0 125 710 A2 | 11/1984 |
| EP | 0 333 464 A1 | 9/1989 |
| EP | 1 522 545 A1 | 4/2005 |
| EP | 2 767 520 A2 | 8/2014 |
| JP | H1-207375 A | 5/1997 |
| JP | H9-113402 A | 5/1997 |
| JP | 2010-106049 A | 5/2010 |
| JP | 2014-529733 A | 11/2014 |
| JP | 2021-502495 A | 1/2021 |
| WO | 03/053487 A1 | 7/2003 |
| WO | 2011/049607 A1 | 4/2011 |
| WO | 2013/036356 A2 | 3/2013 |
| WO | 2014/095633 A1 | 6/2014 |
| WO | 2014/186306 A1 | 11/2014 |
| WO | 2019/090218 A1 | 5/2019 |

OTHER PUBLICATIONS

International Search Report, Application No. PCT/NL2019/050218, dated Aug. 16, 2019, pp. 1-3.
International Search Search and Written Opinion, Application No. PCT/NL2019/050218, dated Aug. 16, 2019, pp. 1-11.
Japanese Office Action, dated May 10, 2021, 8 pages.

* cited by examiner

*Primary Examiner* — Peter Radkowski
(74) *Attorney, Agent, or Firm* — Hoffmann & Baron, LLP

(57) ABSTRACT

A method for applying a water-absorbing polymer coating onto an optical fibre having a core, a cladding and at least a primary coating includes coating the optical fibre with an organic solvent-free radiation curable coating composition and initiating polymerization. The polymerization may be initiated with UV light. The coated optical fibre may be combined in a tubular or flat sheath, e.g., as a multi-fibre cable or ribbon. The coated optical fibre may be a coloured coated optical fibre.

15 Claims, No Drawings

METHOD FOR COATING AN OPTICAL FIBRE AND AN OPTICAL FIBRE COMPRISING THE SAME

CROSS-REFERENCE TO RELATED APPLICATIONS

This application is the National Stage of International Application No. PCT/NL2019/050218, filed Apr. 11, 2019, which claims the benefit of Netherlands Application No. 2020771, filed Apr. 16, 2018, the contents of which is incorporated by reference herein.

FIELD OF THE INVENTION

The present invention relates to a method for coating an optical fibre. More in particular, the present invention relates to a method for applying an optical fibre coating composition that provides water blockage due to its swelling behaviour. The invention also concerns the coated fibre, which may be bundled and contained within a tube or sheath without need for gel or other water-blocking products or risk of water penetration into the tube.

BACKGROUND OF THE INVENTION

An optical fibre or optic fibre is a flexible, transparent fibre made by drawing glass (silica) or plastic to a diameter typically in the region of 0.05 to 0.125 µm. Optical fibres are used most often as a means to transmit light between the two ends of the fibre and find wide usage in fibre-optic communications. Optical fibres typically include a core surrounded by a transparent cladding material with a lower index of refraction. Light is kept in the core by the phenomenon of total internal reflection which causes the fibre to act as a waveguide.

The light is guided down the core of the fibre by an optical cladding with a lower refractive index that traps light in the core through total internal reflection. The cladding is coated by a buffer that protects it from moisture and physical damage. Generally, these coatings are UV-cured urethane acrylate composite or polyimide materials applied to the outside of the fibre. The coatings protect the very delicate strands of glass or plastic fibre and allow them to survive the rigors of manufacturing, proof testing, cabling and installation. Today's optical fibre processes employ a dual-layer coating approach. An inner primary coating is designed to act as a shock absorber to minimize attenuation caused by microbending. An outer secondary coating protects the primary coating against mechanical damage and acts as a barrier to lateral forces. With protective coating, most single fibres are from 0.25 to 0.5 mm thick. The outer coating may be coloured to differentiate strands in bundled cable constructions. Alternatively, one or more separate ink coatings may be applied.

Fibre optic coatings protect the optical fibres from scratches that could lead to strength degradation. The combination of moisture and scratches accelerates the aging and deterioration of fibre strength. When fibre is subjected to low stresses over a long period, fibre fatigue can occur. Over time or in extreme conditions, these factors combine to cause microscopic flaws in the glass fibre to propagate, which can ultimately result in fibre failure, attenuation and loss of optical signal ("damping").

External optical fibre cable jackets and buffer tubes may protect optical fibre from environmental conditions that can affect the fibre's performance and long-term durability. On the inside, coatings ensure the reliability of the signal being carried and help minimize attenuation due to microbending.

Optical fibre therefore consists of a core, a cladding layer and a protective coating. Individual optical fibres (or fibres formed into ribbons or bundles) then may have a tough resin buffer layer or core tube(s) extruded around them to form the cable core. Several layers of protective sheathing, depending on the application, are typically added to form the cable.

U.S. Pat. No. 5,242,477 describes an apparatus for coating optical fibres. An optical fibre, destined to receive a hermetic coating, is moved through a hermetic coating apparatus wherein the fibre, entering the hermetic coating apparatus as a predetermined temperature, is caused to be engaged by a reactive gas. The reactive gas, reacting with the heated fibre, is effective to cause a layer of a hermetic material to be deposited adjacent to the outer surface of the fibre. A cross-flow purge gas is effective to prevent a resultant accumulation of a soot comprising reactive components of the reactive gas adjacent to portions of the hermetic coating apparatus which become heated by the fibre. Failure to prevent the accumulation of the soot may lead to fibre abrasions and reduced fibre strength.

EP0125710 discloses a rapid U.V. curing composition particularly adapted for forming a protective coating on glass optical fibres comprising a solvent-free mixture of an acrylated aromatic urethane oligomer, a mixture of a U.V. curable mono-, di-, and/or trifunctional monomer, a photosensitive initiator such as an acetophenone or a derivative thereof and an amine accelerator.

EP2767520 describes a method of coating a silica-silica optical fibre, comprising, in a single pass on a fibre coating machine: applying a primary layer of UV curable acrylate carrying a first colour, on said fibre; and applying a second layer of UV curable acrylate carrying a second colour different from the first colour, on top of the primary layer, the second layer being applied in patterns over the primary layer. The method may be used to identify fibres in bundles or loose tubes where there are more fibres than there are basic colours.

US2005028731, for instance, describes a fibre coating applicator, for coating an optical fibre.

WO2011049607 relates to radiation curable compositions. The radiation curable optical fibre primary coating compositions comprise an oligomer, a reactive diluent monomer blend comprising at least two reactive diluents monomers, and at least one photosensitive initiator, said reactive diluent monomer blend being substantially free of non-aryl reactive diluent monomers; wherein when an aryl reactive diluent monomer is present that has a molecular weight less than about 300, it is present at no more than about 10 wt. % of the total formulation.

In U.S. Pat. No. 6,489,376 a fast-curing, low viscosity composition for coating an optical fibre is disclosed. The coating composition is a radiation curable composition containing: a radiation curable oligomer, a free radical photosensitive initiator, and a mixture of reactive diluents including a low molecular weight (meth)acrylate having tri-, tetra-, penta- or higher functionality.

A critical concern in cabling is to protect the fibre from contamination by water. The combination of moisture and scratches accelerates the aging and deterioration of fibre strength. When fibre is subjected to low stresses over a long period, fibre fatigue can occur. Over time or in extreme conditions, these factors combine to cause microscopic flaws in the optical fibre to propagate, which can ultimately result in fibre failure. Protection is accomplished by use of solid barriers such as copper tubes, and water-repellent gel or water-absorbing powder surrounding the fibre. For instance, gel may be used within tubes containing a bundle of optical fibres to prevent water from entering, but this "wet" approach affects the ease of handling. Yarn provided with super-absorbing polymers (SAP) or SAP powders may be included instead, the "dry" approach, but these are bulky and/or may cause localized pressure leading to attenuation and loss of optical signal. Moreover, yarn provided with super-absorbing polymers may cause processing issues and reduce production efficiency when putting fibres in tubes.

Water-absorbing powder and water-swellable, super-absorbing polymers (SAP) are described in e.g., EP1522545, U.S. Pat. Nos. 5,059,664, 6,403,674, US2015065594 and US2015314034.

Providing a water-swellable coating directly on top of the optical fibres provides protection against moisture and circumvents the disadvantage of yarn, but may create other problems. It must be possible to apply the coating composition onto an optical fibre in a very controlled manner. Moreover, the coating should be even and hold even under applied water pressure.

Surprisingly, the inventors found a coating composition that meets the stringent requirements for application on optical fibres. The new coating composition is ideal for application on optical fibres and may be applied onto the secondary coating of the optical fibres and/or onto the ink coatings of the optical fibres. The new coating composition may be coloured itself. Applying the liquid coating on an optical fibre as carrier with a desired layer thickness can be done on a UV colouring line such as used in the optical fibre cable industry. UV curing the liquid coating on fibre will result in having a smooth, clear and transparent super absorbing polymer on the optical fibre with a constant desired layer thickness and amount of polymer per length. Radiation curing may also be used. The new coating may be applied on single optical fibres as well as bundles or ribbons. Obviously the new coating composition may also be applied onto substrates other than optical fibres.

SUMMARY OF THE INVENTION

Accordingly, the present invention provides a method for applying a water-absorbing coating onto an optical fibre.

In addition the present invention provides a coated optical fibre, which may be combined in a tubular or flat sheath, e.g., as a multi-fibre cable or ribbon. More in particular a colour coded coated optical fibre is provided.

DETAILED DESCRIPTION OF THE INVENTION

Acrylic acid is polymerizable by radical polymerization. A copolymerizable monomer is a monomer having a single unsaturated carbon-carbon bond (monofunctional) or more than one unsaturated carbon-carbon bond (multifunctional) that is capable to co-react in the polymerization of acrylic acid.

The optical fibre used as substrate of the coating composition of the present invention may be made out of polymer, silica or minerals. A polymer optical fibre (POF) uses, for instance PMMA or polystyrene as the core, wherein the fibre cladding is made of silicone resin. Glass optical fibres are almost always made from silica, but some other materials, such as fluorozirconate, fluoroaluminate, and chalcogenide glasses as well as crystalline materials like sapphire, are used for longer-wavelength infrared or other specialized applications. All are equally applicable. Moreover, as explained above, the optical fibre generally has a protective (dual layer) coating applied during its production. It may also have a colour coating applied. The present coating composition is particularly suitable for glass optical fibres.

The amount of coating applied on an optical fibre may be expressed in thickness of the layer. However, for optical cables it is more common to express the amount in grams per kilometre optical fibre, whereby optical fibre of a defined length is weighed before and after application of the coating. The latter definition is therefore used in the present application.

Optical fibres may be combined into bundles or ribbons. The coating composition of the present invention is equally applicable onto single strands of optical fibre, and combined strands. It is particularly applicable on strands of optical fibre that are applied inside of tubes and sheaths that may suffer from water penetration. The coating composition of the present invention is water-absorbing and thus blocks water from penetrating into said tubes and sheaths. Moreover, the coating composition of the present invention is water-swellable and thereby may expand by a factor in the range of 5-20. This likewise helps to seal the tubes and sheaths and protects them from water penetration.

Radiation-curable acrylate based coating compositions for optic fibres are known. The coating composition of the present invention differs in a number of aspects. The most important aspects, as mentioned above, is that it is water-absorbing and water-swellable. Moreover, the coating composition is suitable strong to withstand penetration by water, even under pressure. Besides, the coating composition may be applied by common coating applicators.

Whereas common radiation-curable acrylate based coating compositions for optic fibres are based on (meth)acrylic acid and derivatives thereof, the present composition is based on polyacrylic acid, that is copolymerized with a multifunctional monomer to create a network, and that is neutralized (before polymerization) with a base such as NaOH. Monomers other than (neutralized) acrylic acid may be used, e.g., up to 10 mol %, preferably up to 5 mol %, but more preferably near pure (neutralized) acrylic acid is used. Such other monofunctional monomers include any one or more of the monomers mentioned in the art cited in this application, including but not limited to acrylate monomers other than acrylic acid, methacrylate monomers and vinyl monomers. Examples of acrylate monomers include 2-hydroxyethyl acrylate, acrylamide, 2-(2-ethoxyethoxy)ethyl acrylate and glycerol monoacrylate. Methacrylate monomers suitable for use in this invention include methacrylic acid, 2-hydroxyethylmethacrylate, 2-ethoxyethyl methacrylate, and glycerol monomethacrylate. Vinyl monomers suitable for use in this invention include vinyl acetate, vinyl sulfonic acid, vinyl methyl sulfone, vinyl methylacetamide, vinyl butyrate, vinyl propionate, vinyl urea, 2-vinyl pyridine, 4-vinyl pryidine and vinyl-2-pyrrolidone.

According to the invention, the acrylic acid groups in the polyacrylic acid are neutralized to the salt thereof using an inorganic base. Various inorganic bases are suitable for this purpose. The inorganic base is preferably composed of elements from group 1 or 2 of the periodic system of elements, such as KOH and NaOH. Ammonia may also be used. The more of the acrylic acid groups are neutralized, the greater is the capacity of the polyacrylic acid as superabsorbent. Preferably at least 10 mol % of the acrylic acid groups are neutralized, more preferably at least 20 mol %, more preferably at least 50 mol %, more preferably at least 67 mol % is neutralized. All acrylic acid groups may be neutralized, in particular if there is a monofunctional monomer included in the polyacrylic acid. Neutralizing to the point whereby 90 mol % is neutralized may be sufficient. Neutralization is preferably done with caustic soda (NaOH 50 wt. %). In an effective preferred embodiment of the invention, the pH is held in the range of 4.5 to 5.5 during the neutralizing step. This may help to prevent the mixture becoming solid at room temperature. The person skilled in the art will understand that caustic soda at a concentration lower than 50 wt. % may be used, in which case the amount of added water should be adapted accordingly.

In order to form a network, a multifunctional monomer is included. Preferably the acrylic acid and the multifunctional monomer can be dissolved into each other. The monomers are mixed together, whereupon they are polymerized under the influence of a suitable energy source.

A "multifunctional monomer" is defined as a monomer that contains two or more unsaturated carbon to carbon bonds that can participate in free radical polymerization. Suitable multifunctional monomers, like di(meth)acrylates, tri(meth)acrylates, tetra(meth)acrylates and penta(methachrylates) are known in the art. Examples of multifunctional monomers that can be used with the present invention include pentaerythritol triallyl ether, diethylene glycol divinyl ether, triethylene glycol divinyl ether, 1,1,1-trimethylolpropane diallyl ether, allyl sucrose, divinyl benzene, dipentaerythritol pentaacrylate, N,N'-methylenebisacrylamide, triallylamine, triallyl citrate, ethylene glycol diacrylate, diethylene glycol diacrylate, di-ethylene glycol dimethacrylate, tetraethylene glycol diacrylate, trimethylol propane trimethacrylate, ethylene glycol dimethacrylate, tetraethylene glycol dimethacrylate, trimethylol propane trimethacrylate, dipropylene glycol dimethacrylate, ditrymethylol propane tetracrylate, pentaerythritol tetraacrylate, pentaerythritol triacrylate, and vinyl acrylate. Dipropylene glycol diacrylate is an example of a very suitable multifunctional monomer.

The amount of multifunctional monomer is relatively low, for instance in the range of 0.1 to 2 wt. % of the entire monomer mixture, more preferably in the range of 0.2 to 1.5 wt. %. Using less crosslinker may result in a network that is not strong enough. On the other hand, using more crosslinker may result in a network with insufficient capacity to swell and expand.

Based on the weight of the entire composition, acrylic acid, optional monofunctional monomer and multifunctional monomer may be included in an amount in the range of 40-70 wt. %, more preferably in the range of 50-60 wt. %.

Water is part of the coating composition and may be introduced together or separate with the inorganic base. Based on the weight of the entire composition, water may be included in an amount in the range of 15-35 wt. %, more preferably in the range of 20-30 wt. %.

Furthermore, a variety of free radical initiators may be used in the coating composition of the present invention. For instance, photosensitive initiators may be used. The photosensitive initiator preferably comprises an aryl ketone group and is soluble in the reaction mixture, such as for instance 2-hydroxy-2-methyl-1-phenylpropanone, 2,4,6-trimethylbenzoyl diphenyl phosphinoxide, or mixtures thereof. Examples of such photosensitive initiators include benzophenone, Irgacure® 184 from Ciba Specialty Chemicals Corp. of Tarrytown, N.Y., Irgacure® 500 from Ciba Specialty Chemicals, and Lumilink 400 from Parvus.

Based on the weight of the entire composition, the initiator may be included in an amount in the range of 1-10 wt. %, preferably in the range of 2.5-7.5 wt. %, more preferably in the range of 4-6 wt. %. Using less initiator may result in a slow rate of polymerization. Using more initiator may affect the degree of polymerization and therefore the strength of the cured coating composition. Obviously, if any inhibiting components are present in the coating composition, then the amount of initiator may have to be increased to compensate the same.

Moreover, a variety of thickening agents (which definition includes gelling agents and rheology modifiers) may be used. Examples include polysaccharides, gums, clays, fumed silica, precipitated silica, fine talc, chalk, polyvinyl alcohols and polyvinylpyrrolidones. Preferably the thickening agent (or mixture) is used in an amount to create a curable coating composition having a viscosity in the range of 200 to 5000 mPa·s (measured at 25° C. with use of a PCE-RVI 1 rotational viscometer, according to ASTM/DIN ISO 2555). Obviously, the thickening agent should have no adverse effect on the polymerization. Particularly suitable thickening agents have a K-value (viscosity of 1% aqueous solution) in the range of 50-200. Polyvinylpyrrolidones are particularly suitable. Examples include PVP K-60, PVP K-90 or PVP K-120, with PVP K-90 being preferred.

Based on the weight of the entire composition, the thickening agent may be included in an amount in the range of 3-7 wt. %, preferably in the range of 4-6 wt. %. Using less or more thickening agent may affect the application of the coating composition onto the fibre. Moreover, the presence of a thickening agent may affect the strength of the cured coating composition and the degree by which it can expand when absorbing water. Interestingly, polyvinylpyrrolidone appears to have a synergistic effect on the strength of the cured coating composition.

Of particular interest is the use of a colouring agent (in the form of a pigment or dye) to form a coloured coating. Use of coloured coating compositions is known, for instance from U.S. Pat. No. 6,797,740. Like electrical wires, optical fibres are colour coded for field recognition during cable installation. In a fibre optic cable buffer tube containing multiple fibres, each fibre needs to be distinguished from others by means of colour coding. During splicing/joining of two fibre ends, like colour fibres are spliced to ensure continuity in an optical fibre network, TIA/EIA-598 is the most widely used colour coding standard in fibre optic industry. This standard defines recommended identification scheme for individual fibres, buffered fibres, fibre units within a fibre optic cable both for premises and outdoor applications. Examples of the twelve colours often used for making ribbon assemblies include: black, white, yellow, blue, red, green, orange, brown, pink, aqua, violet, and grey.

The colouring agent may be used in the amounts required to meet the above colour coding standard and to provide colouration that is visible without magnification to facilitate identification of the individual coloured optical glass fibre. The amount of the colouring agent should not be so great as to significantly reduce the cure speed of the ink composition or result in other undesirable effects. For instance, based on the weight of the entire composition, each colouring agent may be included in an amount in the range of 0-15 wt. %, preferably in the range of 0-7 wt. %. This is also dependent on the nature of the colouring agent, and the intensity (hue) of the colour. Any inorganic and organic colouring agent that is suitable for making radiation-curable ink compositions can be used in the present invention.

A specific example of a suitable black colouring agent includes carbon black.

A specific example of a suitable white colouring agent includes titanium dioxide.

Specific examples of suitable yellow colouring agents include diarylide yellow and diazo based pigments.

Specific examples of suitable blue colouring agents include phthalocyanine blue, basic dye pigments, and phthalocyanines, preferably, copper(II) phthalocyanine.

Specific examples of suitable red colouring agents include anthraquinone (red), napthole red, monoazo based pigments, quinacridone pigments, anthraquinone, and perylenes.

Specific examples of suitable green colouring agents include phthalocyanine green and nitroso based pigments. Specific examples of suitable orange colouring agents include monoazo and diazo based pigments, quinacridone pigments, anthraquinones and perylenes.

Specific examples of suitable violet colouring agents include quinacrinode violet, basic dye pigments and carbazole dioxazine based pigments.

Suitable aqua, brown, grey, and pink colours can easily be formulated by combining several colouring agents. Indeed, the person skilled in the art is able to form any colour as desired by combining different colouring agents.

Additional additives may be added to the coating composition of the present invention. Such additives include surface active agents, and stabilizers, and the like. In particular the use of a surface active agent (wetting agent) is beneficial. Polyether-modified polydimethylsiloxane is a particularly suitable surface active agent, commercially available from Byk, for instance Byk 302.

Based on the weight of the entire composition, the additive or combined additives may be included in an amount in the range of 0-2 wt. %, preferably in the range of 0.5-1.5 wt. %. The amount of additive or additives depend on the nature and amount of thickening agent. Lower or higher amounts may be applied.

The preferred composition according to the present invention comprises in percentages by weight (wt. %) on the total composition:
a. 40-70 wt. %, preferably 50-60 wt. % acrylic acid or acrylic acid mixture comprising at most 10, more preferably at most 5 wt. % copolymerizable monofunctional monomer; neutralized with an inorganic base, preferably NaOH, more preferably 15-25 wt. %, still more preferably 18-20 wt. % caustic soda (50 wt. %);
b. 0.1-1 wt. % preferably 0.25-0.75 wt. % crosslinker;
c. water, preferably 10-20 wt. %, more preferably 12-17 wt. % water;
d. 3-7 wt. %, preferably 4-6 wt. % thickening agent;
e. 0-15 wt. %, preferably 0-7 wt. % of one or more colouring agents;
f. 0-2 wt. %, preferably 0.5-1.5 wt. % additive(s), comprising one or more of surface active agents, and stabilizers; and
g. 1-10 wt. %, preferably 2.5-7.5 wt. % initiator.

Application of the coating composition of the present invention may be carried out in a conventional applicator, e.g., in a UV colouring line. Such applicators are described in the prior art mentioned in the present application. Colouring systems are for instance provided by Nextrom (e.g., the OFC 52i) and by Medek & Schomer e.g., the GFP series). The amount of coating on an optical fibre may be in an amount in the range of 3-10 g/km, preferably in an amount of 4-8 g/km, more preferably in an amount of 4.25-7.5 g/km. Less may be applied, e.g., in a very tight bundle of optical fibres. Alternatively, more may be applied if the optical fibre is contained rather loosely in a tube. Moreover, the coating composition may be applied onto a bundle of optic fibres or in a manner to form a ribbon of optic fibres.

According to the invention the curing of the coating composition takes place by exposing the coating composition to an energy source wherein radical formation occurs and the polymerization is started due to the presence of the radical-forming polymerization initiator. Diverse energy sources can be used for this purpose, such as for instance gamma radiation and electron radiation. In the preferred embodiment of the invention, wherein the radical-forming polymerization initiator is a photosensitive initiator, the polymerization takes place under the influence of UV light. The use of a photosensitive initiator has the advantage that no spontaneous polymerization occurs in the reaction mixture if it is closed off from light incidence, such as can be the case when for instance peroxides are used. Additionally, the polymerization under the influence of a photosensitive initiator can be initiated immediately using the correct electromagnetic radiation. This in contrast to polymerization initiation using peroxides under the influence of a temperature increase, which always takes some time.

Upon curing the coating formed of super-absorbent polymers is very stable, i.e. retain its absorption capacity for a long time, and can readily withstand for instance high temperatures (100-200° C.) which can occur for a short time during treatment processes of the polymers. The coating of super-absorbent polymers obtained according to the present invention has a very high absorption capacity, (up to more than 100 times its own weight, and even more than 200 times its own weight, such as 225 times its own weight), has a large expansion factor, thus capable of expanding in diameter by a factor of at least 2, more preferably at least 10. Moreover the coating of the present invention is more capable to provide low water penetration length (WPL) than a coating based on the composition of the prior art, such as EP1522545. Ideally the optic fibres coated with a coating composition according to the present invention are used in a tube or sheath without use of gels or other swellable water-blocking materials.

The method for applying a coating of super-absorbent polymers to an optic fibre is further elucidated on the basis of the examples. Thus, optic fibre (comprising a protective coating) is unrolled from a fibre reel. In a conventional applicator the coating composition of the present invention is applied onto the optic fibre, whereupon it is irradiated with UV light causing the coating to be cured. The cured coated optic fibre may then be placed for instance on a reel for further use.

Example 1 (Manufacture of Super-Absorbent Acrylic Polymers)

Ingredients (ingredients in percentage by weight):

| | |
|---|---|
| 55 | acrylic acid |
| 19 | caustic soda (NaOH 50%) |
| 14.5 | water |
| 5 | PVP K-90 (Ashland) |
| 1 | Byk 302 |
| 0.5 | dipropylene glycol diacrylate (DPGDA) |
| 5 | Lumilink 400 (photosensitive initiator; Parvus B. V., Zeewolde, NL) |

Method:
The acrylic acid is mixed with the crosslinker, DPGDA. The mixture is stirred well. Caustic soda is then added slowly, wherein the exothermic reaction is properly monitored. The temperature must be held below 50° C. here. Some increase in temperature is however necessary to obtain a clear solution. During the neutralization the pH of the reaction mixture is held between 4.5 and 5.5. After adding of the caustic soda the mixture is stirred until it has cooled to below 30° C. Water, thickener (PVP K-90) and surface active agent (Byk 302) is added and the mixture is stirred well. A clear mixture is herein obtained.

Next the photosensitive initiator is added, whereupon direct sunlight must be avoided.

Example 2 (WPL of the Fibre Optic Coating Composition According to the Invention)

Glass optic fibre was provided with the coating composition according to the present invention at various dry weights, as set out in Table 1. The coated optic fibres are placed inside tubes of different internal diameter (ID) which is connected to a 1 meter water column. Bundles of 8 optic fibres are used with a tube with an ID of 1.1 mm, and bundles of 12 optic fibres are used with a tube with an ID of 1.5 mm.

In accordance with the F5C test of 60794-1-22 © IEC: 2012(E) norm, the tube is pre-soaked for 10 minutes, to allow the coating composition to swell. However, the test is also performed without pre-soaking, which therefore is a much more severe test. WPL is the length of water penetration until stop measured after 24 hours. Less is better. The results are shown in Table 1.

TABLE 1

| Dry weight coating | WPL | Pre-soak | Number of fibres | Tube ID |
|---|---|---|---|---|
| 4.3 g/km | 52 cm | yes | 12 | 1.5 mm |
| 4.3 g/km | 32 cm | yes | 8 | 1.1 mm |
| 4.3 g/km | 72 cm | no | 12 | 1.5 mm |
| 4.3 g/km | 50 cm | no | 8 | 1.1 mm |
| 7.3 g/km | 15 cm | no | 12 | 1.5 mm |

The WPL of the optic fibre coating composition of the present invention was less than that of a coating prepared in the manner described above, using the composition of EP1522545.

Moreover, the coating optic fibres of the present invention were tested for damping or similar adverse effects and found to meet the current commercial standards.

The invention claimed is:

1. A method for applying a water-absorbing polymer coating onto an optical fibre comprising a core, a cladding and at least a primary coating, the method comprising coating the optical fibre with an organic solvent-free radiation curable coating composition, and initiating polymerization, preferably with UV, wherein said coating composition in percentages by weight based on the total composition (wt. %) consists essentially of:
   (a) 40-70 wt. % of neutralized or partly neutralized acrylic acid or acrylic acid mixture comprising at most 10 wt. % of a copolymerizable monofunctional monomer having a single unsaturated carbon-carbon bond (monofunctional);
   wherein at least 10 mol % of the acrylic acid groups are neutralized with an inorganic base;
   (b) 0.1-1 wt. % of a copolymerizable multifunctional monomer with more than one unsaturated carbon-carbon bond, acting as crosslinker;
   (c) water;
   (d) 3-7 wt. % of thickening agent;
   (e) optionally, one or more colouring agents;
   (f) optionally, one or more additive(s), and
   (g) 1-10 wt. % of free radical initiator.

2. The method of claim 1, wherein at least 10 mol %, preferably at least 20 mol %, more preferably at least 50 mol %, more preferably at least 67 mol % of the acrylic acid groups are neutralized.

3. The method of claim 1, wherein the acrylic acid or acrylic acid mixture is neutralized with an inorganic base, preferably with caustic soda (NaOH), preferably with NaOH (50% by weight).

4. The method of claim 1, wherein the amount of multifunctional monomer is in the range of 0.1 to 2 wt. % of the entire monomer mixture, preferably in the range of 0.2 to 1.5 wt. %.

5. The method of claim 1, wherein the copolymerizable monofunctional monomer is selected from one or more of methacrylic acid, alkylacrylates, methylacrylates, hydroxyalkylacrylates and/or hydroxyalkylmethacrylates, preferably wherein no copolymerizable monofunctional monomer is used.

6. The method of claim 1, wherein the thickening agent is employed in an amount suitable to create a curable coating composition having a viscosity in the range of 200 to 5000 mPa·s (measured at 25° C. with use of a PCE-RVI 1 rotational viscometer, according to ASTM/DIN ISO 2555), preferably polyvinylpyrrolidon (PVP).

7. The method of claim 1, wherein the additive(s) comprise a surface active agent, preferably a polyether-modified polydimethylsiloxane.

8. The method of claim 1, wherein the multifunctional copolymerizable monomer is soluble in the acrylic acid or acrylic acid mixture, preferably selected from a di(meth) acrylate or tri(meth)acrylate, more preferably dipropylene glycol diacrylate (DPGDA).

9. The method of claim 1, wherein the initiator is a photosensitive initiator.

10. The method of claim 1 comprising in percentages by weight (wt. %) on the total composition:
   (a) 50-60 wt. % acrylic acid or acrylic acid mixture comprising at most 5 wt. % copolymerizable monofunctional monomer;
   neutralized with caustic soda, preferably 15-25 wt. %, preferably 18-20 wt. % caustic soda (50% by weight);
   (b) 0.25-0.75 wt. % the copolymerizable multifunctional monomer, acting as crosslinker;
   (c) water, preferably 12-17 wt. % water;
   (d) 4-6 wt. % thickening agent;
   (e) 0-15 wt. %, preferably 0-7 wt. % of one or more colouring agents;
   (f) 0-2 wt. %, preferably 0.5-1.5 wt. % additive(s), comprising one or more of surface active agents, and stabilizers, and
   (g) 2.5-7.5 wt. % initiator.

11. The method of claim 1, wherein the organic solvent-free radiation curable composition is applied onto the optical fibre in an amount in the range of 3-10 g/km, more preferably in an amount of 4-8 g/km, more preferably still in an amount of 4.25-7.5 g/km.

12. An optical fibre comprising a core, a cladding and at least a primary coating, and further comprising a radiation cured, water-absorbing polymer coating obtained by the method of claim 1, preferably capable of expanding in diameter by at least a factor 2, more preferably by at least a factor 10.

13. The optical fibre of claim 12, as part of a bundle or ribbon, preferably contained in a tube or sheath with a water penetration length (WPL) of less than 1 meter according to the F5C test of the 60794-1-22 © IEC:2012(E) norm.

14. The optical fibre of claim 13, wherein the tube or sheath contains no other gels and/or swellable water blocking material.

15. The optical fibre of claim 12 having a coloured coating.

* * * * *